Sept. 24, 1935.  A. W. KIDDLE  2,015,404
APPARATUS FOR PREVENTING TWISTING OF FLEXIBLE ELECTRIC CORDS
Filed Aug. 31, 1934
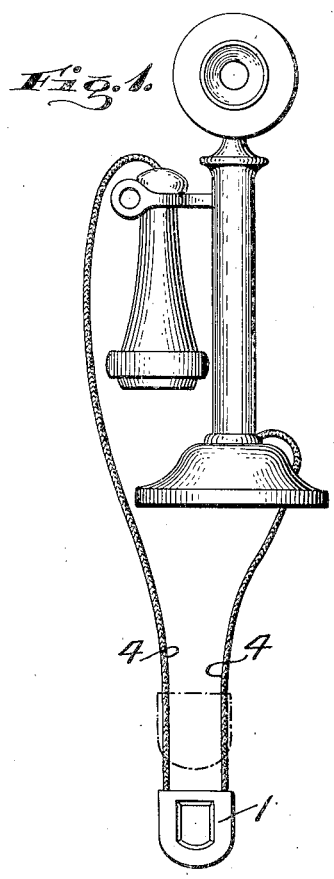
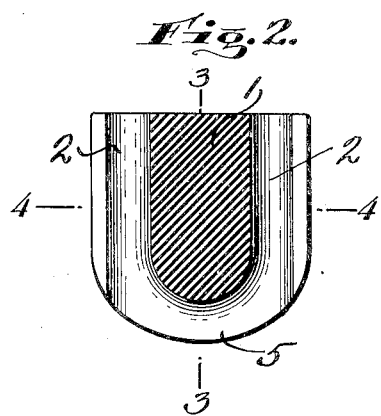
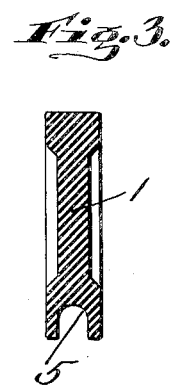
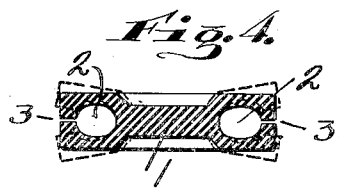
INVENTOR
Alfred H. Kiddle.
BY
Kiddle, Bithell and Montgomery
ATTORNEYS Patented Sept. 24, 1935

2,015,404

UNITED STATES PATENT OFFICE 2,015,404

APPARATUS FOR PREVENTING TWISTING OF FLEXIBLE ELECTRIC CORDS

Alfred W. Kiddle, New York, N. Y.; Alfred M. F. Kiddle and George H. Halbert executors of said Alfred W. Kiddle, deceased Application August 31, 1934, Serial No. 742,287

5 Claims. (Cl. 24—129)

My invention relates to a device for preventing the twisting and kinking of flexible electric cords such, for example, as the cords or conductors employed on telephone instruments leading from the receiver to the pedestal and from the bell box to the pedestal, wherein due to the relative disposition of the receiver, pedestal and bell box each cord is bent back upon itself to form a bight. These cords are composed of fine stranded wires and have an inherent tendency to twist with the result that in telephone installations, for example, where as above mentioned bights are formed in the cords attached to the instrument, when the legs of the bights touch each other the cords become badly twisted and kink which is not only annoying but in time unfits the cords for use, necessitating replacement.

I have discovered that this trouble and annoyance is avoided by the use of the device constituting the subject matter of the present application, this device being of such a nature as to maintain the legs of the bight of the cord out of contact with each other from the point of application of the device to the terminals of the cord.

The present device is relatively inexpensive, can be attached to the cord without the necessity of disconnecting the terminals of the cord and is shiftable along the cord to adjust the device relatively to the cord terminals.

In the accompanying drawing:

Fig. 1 shows an embodiment of my invention with the device in place on the cord leading from the receiver of a telephone instrument to the base of the pedestal;

Fig. 2 is a sectional view through the device itself;

Fig. 3 is a section on the line 3—3 of Fig. 2; and

Fig. 4 is a section on the line 4—4 of Fig. 2.

Referring to the drawing in detail, my improved device comprises a block designated 1 of suitable flexible material as for example vulcanized rubber, the block being provided with parallel longitudinally extending bores 2, 2 adjacent the opposite edges of the block, the two opposite sides of the block being slit lengthwise through the outer wall of each of these bores as shown at 3. The slit portions of block 1 are resilient so that the bores 2, 2 can be opened by simply spreading apart the material of the block at the slits to permit of the insertion of the legs 4 of a bight in a flexible electric cord such as the telephone cord illustrated in Fig. 1. The bores 2, 2 are of such diameter that after the legs 4 of the bight in the cord have been inserted therein and the material of the block has been allowed to spring back into place the legs of the bight will be gripped frictionally sufficiently to enable the block to retain itself in adjusted position with respect to the legs of the bight in the cord. If desired a groove 5 may be provided in the rear end of the block 1 to receive the end of the bight, as will be appreciated.

The bores 2, 2 extend parallel to each other for a substantial distance and are spaced from each other sufficiently so that when the device is applied to a flexible cord, for example, the legs 4 of the bight will be maintained out of contact with each other from the terminals of the cord to the point of application of the device, thereby to prevent twisting of the legs of the bight about each other.

While I have mentioned flexible vulcanized rubber as being suitable material for the block 1, it is to be understood that other materials may be substituted, if desired, rubber having been mentioned owing to its low cost and by reason of the fact that the same is easily molded enabling the finished block to be molded in one operation, thus making for a relatively inexpensive device. However, as just mentioned, other materials may be substituted for the rubber so long as the material used is of such a nature that the side walls of the bores 2, 2 can be flexed to open up the slits 3 to permit of the insertion of the legs of the bight in the cord, it being understood that it is the intent of this invention to provide a device capable of being readily attached to a flexible cord without necessitating disconnecting the terminals of the cord.

What I claim is:

1. A device of the class described comprising an integral block provided with a bore adjacent opposite edges of the block and extending lengthwise of the block, the outer wall of each bore being resilient and split lengthwise of the bore to permit of the insertion of the legs of a bight in a cord said bores extending parallel to each other and being so spaced as to retain the legs of the bight in spaced relation from the terminals of the legs of the bight to the point of application of the device thereby to prevent twisting of the legs of the bight about each other.

2. A device of the class described comprising an integral block provided with two bores extending lengthwise of the block parallel to each other, the outer wall of each bore being resilient and slit lengthwise so that the bores may be spread open for the reception of the legs of a bight in a cord and will spring back into position frictionally to grip the legs of the bight and retain the device in position on the cord, said bores being so spaced as to retain the legs of the bight in spaced relation from the terminals of the legs of the bight to the point of application of the device thereby to prevent twisting of the legs of the bight about each other.

3. A device of the class described comprising a vulcanized rubber block bored lengthwise adjacent two opposite sides of the block the outer wall of each bore being resilient and the sides of the block being slit through the resilient outer wall of each bore to permit the bores to be spread open for the reception of the legs of a bight in a cord, said bores extending substantially parallel to each other for a substantial distance and so spaced as to retain the legs of the bight in spaced relation from the terminals of the legs of the bight to the point of application of the device thereby to prevent twisting of the legs of the bight about each other.

4. A device of the class described comprising an integral block bored lengthwise adjacent two opposite edges of the block, the outer wall of each bore being resilient and the sides of the block being slit through the resilient outer wall of each bore to permit the bores to be spread open for the reception of the legs of a bight in a cord, said block being provided with a groove in its rear end for the reception of the end of the bight, said bores extending parallel to each other for a substantial distance and so spaced as to retain the legs of the bight in spaced relation from the terminals of the legs of the bight to the point of application of the device thereby to prevent twisting of the legs of the bight about each other.

5. A device of the class described comprising a resilient block of vulcanized rubber bored longitudinally adjacent two opposite edges, the sides of said resilient block being slit through the outer walls of said bores to permit the bores to be opened for the reception of the legs of a bight in a cord, said bores being of such diameter that upon the introduction of the legs of the bight thereinto the same will be gripped by the block and the block frictionally held in place, said bores also being so spaced as to retain the legs of the bight in spaced relation from the terminals of the legs of the bight to the point of application of the device, thereby to prevent twisting of the legs of the bight about each other.

ALFRED W. KIDDLE.